May 5, 1964   A. ERTAUD   3,131,940
FLUID-TIGHTNESS DEVICE FOR THE PASSAGE OF A ROTATING
SHAFT THROUGH A WALL
Filed Aug. 5, 1957   2 Sheets-Sheet 2

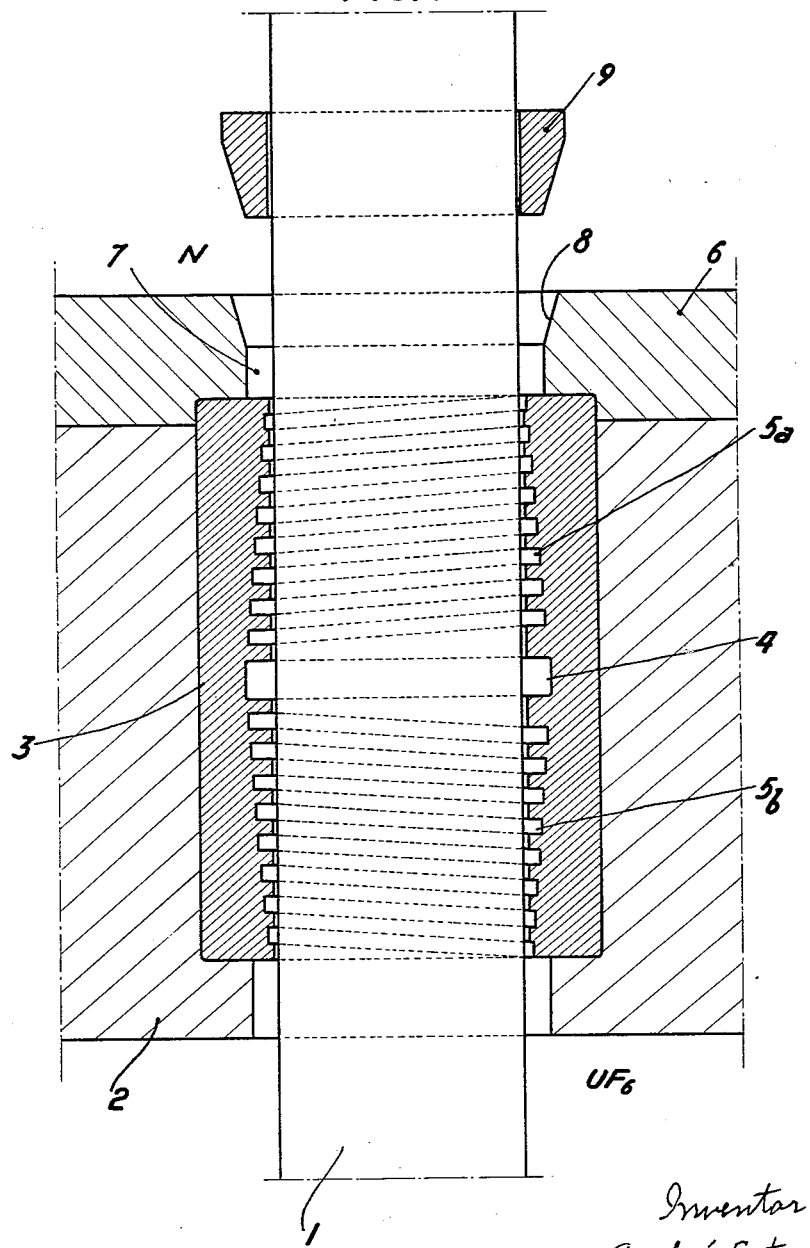

INVENTOR
ANDRE ERTAUD

BY
ATTORNEY 3,131,940
FLUID-TIGHTNESS DEVICE FOR THE PASSAGE OF A ROTATING SHAFT THROUGH A WALL
André Ertaud, Paris, France, assignor to Societe Alsacienne de Constructions Mecaniques, Mulhouse, France, a corporation of France
Filed Aug. 5, 1957, Ser. No. 676,137
Claims priority, application France Feb. 12, 1957
10 Claims. (Cl. 277—28)

The present invention relates to means for ensuring fluid-tightness between two media separated by a wall through which passes a rotating shaft.

In general, fluid-tightness is obtained in these cases, either by means of stuffing-boxes or joints of various types and constructions, or by means of labyrinth packings. However carefully such stuffing-boxes or joints are formed and prepared, it is frequently difficult to ensure a perfect fluid-tightness by this means. On the other hand, it is not always possible to find for these devices materials of construction which are capable of resisting the attacking action which one and/or the other of the media to be separated may possess. As regards labyrinth joints, quite apart from their bulk, they have the disadvantage that in most cases they do not provide by themselves an absolute fluid-tightness.

Now, in certain cases, it is absolutely essential to obtain a perfect isolation, without any possibility of leakage or of contact of any kind whatever between the two media to be isolated. This is the case for example with centrifugal compressors intended to ensure the circulation of an attacking and radio-active gas, such as for example hexafluoride of uranium at low pressure. It will be understood that in such cases it is necessary to avoid not only all losses of gas to the exterior, by reason of the danger due to the radio-active gas, but also any entry into the chamber containing the radio-active gas of any fluid which is liable to contaminate it or to react with it in an undesirable manner. Now, the shafts of rotary compressors which are contemplated here by way of example of application of the invention, rotate at very high speeds and it is very difficult to produce fluid-tight joints of the usual type which have at the same time the required chemical and mechanical resistance.

In order to reduce the risk of losses of attacking gas towards the exterior and especially the risk of penetration of the surrounding atmosphere into the chamber in which the gas to be isolated is contained, measures have already been proposed which consist in creating on the external face of the wall of the said chamber and around the shaft which passes through it, a chamber filled with an inert gas such as nitrogen, at a pressure which is preferably of the same order as that existing in the chamber. However, the problem of the production of perfect fluid-tightness between the two chambers remains unsolved.

The present invention has for its object a device which enables this problem to be solved by preventing in a practically radical manner all possibility of contact between the media at low pressure obtaining on each side of a wall through which passes a rotating shaft.

In this device, a new application is made of the principle of the rotary molecular vacuum pump of the type known by the name of the Holweck pump. It is known that rotary molecular pumps which are intended to operate on the vacuum created by a preparatory pump and to increase this vacuum, comprise a rotor and a stator separated by a fairly small distance, the rotor rotating at high speed. The moving wall of the rotor carries away with it the molecules of the drawn-in gas which come into contact with it. If the pressure obtaining in the space comprised between the stator and the rotor is sufficiently low for the number of shocks or collisions between molecules in the gas to be relatively small with respect to the number of collisions of molecules against the wall of the rotor, the said molecules are to a large extent carried away in the direction of rotation of the rotor. It is thus only necessary to arrange judiciously an admission port and a delivery port in order to ensure a very high vacuum at the admission. In the Holweck pump, the rotor is constituted by a smooth cylinder and the stator is a cylindrical chamber coaxial with the rotor, and inside the internal wall of the stator there are machined two helicoidal grooves starting from an admission port located in the central transverse plane of the unit, the depth of these grooves increasing as they approach the suction port and opening at the two extremities of the stator into end chambers coupled to the delivery of the pump.

The fluid-tight device in accordance with the invention comprises a stator rigidly fixed in a totally fluid-tight manner to the wall which separates the two media to be isolated, and forming a sleeve surrounding the rotating shaft with a small clearance, the said stator forming with the said shaft and substantially in its central transverse plane, an annular chamber in which terminate two helicoidal grooves of opposite thread, the said grooves being machined in either of the oppositely-facing surfaces of the stator and the rotor, and having a depth which progressively decreases from the central annular chamber towards the extremities of the stator, accessory means being provided for preventing any passage of gas along the rotor from one extremity of the stator to the other when the shaft is stationary, and being arranged to come into action as soon as or preferably just before the stopping of the said shaft.

By virtue of this device, a high vacuum is created in the central annular chamber during the rotation of the shaft, by forcing back towards their origin the molecules of gas which would have a tendency to diffuse from one side or from the other, between the stator and the rotating shaft.

The helicoidal grooves are preferably machined in the internal surface of the stator but they could be formed in the wall of the rotating shaft. When the helicoidal grooves are formed in the inner face of the stator, the oppositely-handed spirals originate in the central section of the stator and progress respectively towards the two extremities of the stator, for a given direction of rotation of the shaft. When the grooves are formed in the outer face of the rotor, the oppositely-handed spirals progress respectively towards the two extremities of the stator for the direction of rotation of the shaft opposite to said given direction. In the same way, the central annular chamber may be formed in the stator alone or both in the stator and in the rotating shaft.

In order to increase the linear speed of the wall of the rotating shaft in the zones located on each side of the central annular chamber, the portion of the shaft located inside the stator can be given a bi-conical form having a maximum diameter over the zone of the said chamber, the stator then having a corresponding internal shape.

The means for ensuring the fluid-tightness of the device when the shaft is stationary may be formed for example by a vacuum pump coupled to the central annular chamber, but it is preferred to utilise for this purpose a fluid-tight ring of conical external shape, surrounding the shaft at one of the extremities of the stator and arranged so as to be engaged by the action of a thrust mechanism, between the shaft and a seating formed in a portion rigidly fixed to the wall separating the media to be isolated, the thrust mechanism or, in the first case, the vacuum pump being arranged so as to be set in operation as soon as the shaft stops turning, or when its speed of rotation falls below a pre-determined value.

The accompanying drawings show in axial cross-section in FIG. 1 an example of construction of a device in accordance with the invention, applied to the particular case already considered of the isolation between on the one hand the body of a rotary compressor which effects the circulation at low pressure of a gas such as hexafluoride of uranium in course of irradiation in a nuclear reactor, and on the other hand an intermediate chamber filled with nitrogen at low pressure. Only those parts of the machine have been shown which are directly associated with the invention.

Figure 3:
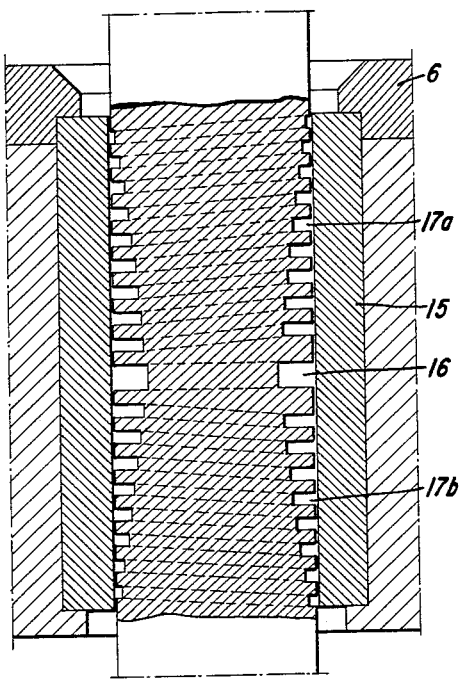
FIGS. 3, 4 and 5 show in axial cross-section modified forms of the shaft and stator construction.

In the construction shown in FIG. 1, the compressor comprises a vertical rotating shaft 1 which passes through a wall 2 below which there exists an atmosphere of hexafluoride of uranium, $UF_6$, at an absolute pressure of a few centimeters of mercury. On the upper side of the wall 2, there exists an atmosphere of nitrogen, N, at a pressure equal or of the same order.

In accordance with the invention, the shaft 1, the external wall of which is smooth, is surrounded with a clearance of 0.025 to 0.03 mm. by a stator 3 constituted by an internally cylindrical sleeve fixed in a totally fluid-tight manner in the wall 2.

In the internal wall of the stator 3, there are machined on the one hand a central annular groove 4 having a depth of 6 mm. and, on the other hand, two helicoidal grooves 5a and 5b of opposite thread and progressing respectively towards the opposite extremities of the stator in the direction of rotation of the shaft 1, the said grooves terminating in the central groove 4 and having a depth decreasing from the groove 4 towards the extremities of the stator. The depth of the groove 4 and the grooves 5a and 5b, together with the pitch of these grooves have been greatly exaggerated in the drawing, the pitch being in reality for example 15 mm. and the depth of the grooves varying from 5 to 0.5 mm.

On the upper face of the wall 2 is secured a metallic plate 6 through which the shaft 1 passes by an orifice 7 milled so as to form a seating 8 on which can be applied an annular fluid-tight joint 9 which is slightly elastic, for example of poly-tetrafluoroethylene, which surrounds the shaft 1 with a slight play, and the external surface of which has a conical shape corresponding to that of the seating 8. The control mechanism for applying the joint 9 may be electro-mechanical and is arranged in a manner known per se, so as to force the joint 9 hard against the seating 8, thus squeezing the said joint on to the shaft 1, as soon as the latter stops turning or as soon as its speed falls below a predetermined value, and to displace the joint 9 in the opposite direction as soon as the shaft 1 begins to rotate, or when its speed exceeds the said predetermined value.

Figure 2:
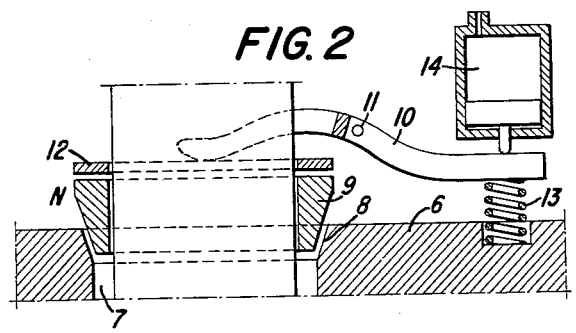
FIG. 2 shows one form of mechanism for ensuring the fluid-tightness of the device when the shaft is stationary.

One form of control mechanism for applying the joint 9 is shown in FIG. 2 and comprises a forked lever 10 pivoted at 11 and acting on the joint 9 through an interposed pressure ring 12. When the shaft is stationary or rotating slowly, the lever 10 compresses the joint 9 in the conical space 8 under the force of a strong compression spring 13 supported for example on the plate 6. When the shaft begins to rotate or reaches a predetermined speed, fluid is supplied to the hydraulic jack 14 by a suitable pump, not shown, driven by the shaft 1. The piston in the jack is thereby moved downwardly against the compressive force of the spring 13 thereby relieving the pressure of the lever 10 on the joint 9 so that the joint will be released from compression against the seat 8 to allow free rotation of the shaft.

In accordance with the explanations already given, when the shaft 1 is driven in rotation, the whole of the device described above operates in the same manner as a Holweck pump, with this difference that a high vacuum is created in the groove 4 without the molecules of gas which are present in this groove becoming replaced by others as is the case with the Holweck pump, all the molecules of $UF_6$ or of nitrogen which would tend to diffuse along the shaft 1, being forced back towards their origin.

By way of example, with a pressure of 70 mm. of mercury for the gases situated on each side of the wall 2, and a clearance of 0.025 mm. between the stator 3 and the shaft 1, a vacuum can be obtained in the groove 4 of the order of $1.4 \times 10^{-5}$ mm. of mercury, which ensures a practically absolute isolation between the two faces of the wall 2.

The joint 9 ensures complete fluid-tightness when the shaft is stationary.

It will be understood that the device in accordance with the invention prevents all friction between the stator 3 and the shaft 1, and thus considerably improves the efficiency of the rotating system.

As previously indicated, the helicoidal grooves and central annular chamber may be formed in the exterior surface of the shaft rather than in the interior surface of the stator. Such a construction is shown in FIG. 3, the smooth walled stator being indicated therein by the reference numeral 15, the annular chamber by 16, and the oppositely directed helicoidal grooves by 17a and 17b. The grooves 17a and 17b progress respectively towards the two extremities of the stator in the direction opposite to the direction of rotation of the shaft.

Figure 4:
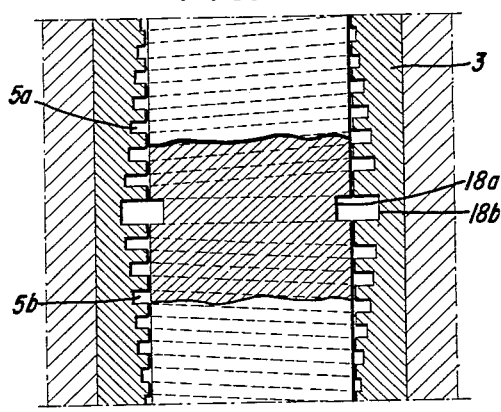

Also as previously indicated, the central annular chamber may be formed by radially aligned grooves in the exterior and interior surfaces, respectively, of the shaft and stator. Such a construction is shown in FIG. 4 wherein the central chamber is defined by a groove 18a formed in the exterior surface of the shaft in radial alignment with groove 18b formed in the interior surface of the stator.

Figure 5:
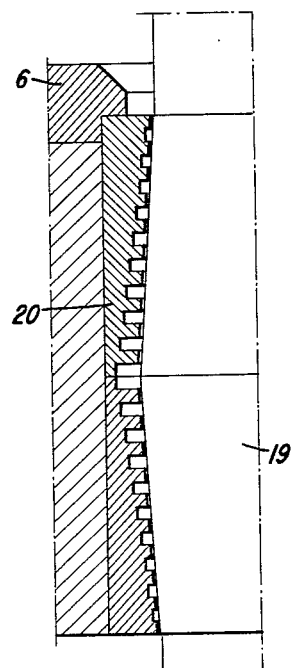

In the construction shown in FIG. 5, the portion of the shaft located inside the stator is given a bi-conical form having a maximum diameter at the zone of the central annular chamber, and the stator is given a complementary internal shape. In this manner, and as previously indicated, the linear speed of the surface of the rotating shaft in the zones located on each side of the central annular chamber increases in the directions toward the central chamber. In FIG. 5, the bi-conical shaft is indicated by the reference numeral 19 and the stator by numeral 20.

What I claim is:

1. Apparatus comprising a housing member and a rotatable shaft member, said housing member having a bore therethrough and said shaft member extending through said bore and having a diameter less than that of said bore and thereby defining a clearance space with said housing member, one of said members being provided with an annular chamber and oppositely directed spiral grooves extending in opposite directions from said annular chamber whereby relative rotation of said members at high speed creates a substantial vacuum in said chamber.

2. Apparatus as claimed in claim 1 wherein said grooves have depths which increase toward said chamber.

3. A device for ensuring fluid-tightness between two gas-containing zones separated by a wall through which passes a rotating shaft member, the said device comprising essentially, a stator member rigidly fixed to the said wall in a totally fluid-tight manner and forming a sleeve surrounding the said rotating shaft with a small clearance, one of said members having an annular groove formed in a surface thereof to provide an annular chamber between said members, two helical threads formed in said one member and being spiraled respectively in opposite directions away from the ends of the chamber to the ends of the stator through which the shaft emerges, the directions of the threads being so related to the direction of rotation of the shaft and the contiguous surfaces of said members being so fitted that the chamber is evacuated upon rotation of the shaft, said threads having a depth which decreases progressively towards said ends, a sealing member surrounding the shaft exteriorly of the stator and movable to seal the gap between the shaft and stator and means under control of the shaft to move the sealing member to seal the gap when the speed of rotation of the shaft falls below a predetermined value.

4. In a device for ensuring fluid-tightness between two fluid-containing zones separated by a wall through which passes a rotary shaft member, an imperforate stator member adapted to be fixed in said wall in a totally fluid-tight manner and surrounding said rotating shaft member, said members having adjacent surfaces of revolution fitted together with a small clearance between them, one of said surfaces having formed therein helicoidal grooves respectively extending in opposite directions from an intermediate portion of said one surface at the inner extremities of said grooves, said helicoidal grooves having opposite directions of thread and having depths which decrease progressively in the directions from said intermediate portion toward the extremities of said stator, said surfaces constituting molecular pump means operative upon rotation of said shaft member in one direction to propel fluid molecules in said grooves away from said intermediate portion and thereby maintain a substantial vacuum at the inner extremity of each of said grooves.

5. A device as claimed in claim 4, in which the said helicoidal grooves are formed in the said stator, the opposite spirals progressing respectively towards the two extremities of said stator in the direction of rotation of said shaft.

6. A device as claimed in claim 4, in which the said helicoidal grooves are formed in the said shaft, the opposite spirals progressing respectively towards the two extremities of said stator, in the direction opposite to the direction of rotation of said shaft.

7. A device as claimed in claim 4, in which the portion of the said shaft located inside the said stator, and the corresponding internal surface of the said stator are biconical and have maximum diameter in the vicinity of the said intermediate portion.

8. A device as claimed in claim 4, said intermediate portion comprising an annular groove defining with the other of said surfaces an annular chamber between the inner extremities of said helicoidal grooves.

9. A device as claimed in claim 8, in which the said annular chamber is formed in the internal surface of the said stator.

10. A device as claimed in claim 8, in which the said annular chamber is formed both in the internal surface of the said stator and the external surface of the said shaft.

References Cited in the file of this patent

UNITED STATES PATENTS

| | | |
|---|---|---|
| 752,170 | Krough | Feb. 16, 1904 |
| 1,493,598 | Buckwalter | May 13, 1924 |
| 1,552,666 | Banbury | Sept. 8, 1925 |
| 1,770,496 | Lawaczeck | July 15, 1930 |
| 2,156,161 | Owens | Apr. 25, 1939 |
| 2,163,153 | Peterson | June 20, 1939 |
| 2,195,496 | Reed | Apr. 2, 1940 |
| 2,254,862 | Watson et al. | Sept. 2, 1941 |
| 2,487,177 | Pollock | Nov. 8, 1949 |
| 2,643,141 | Bryant | June 23, 1953 |

FOREIGN PATENTS

| | | |
|---|---|---|
| 412,554 | France | July 16, 1910 |